Figure 1:
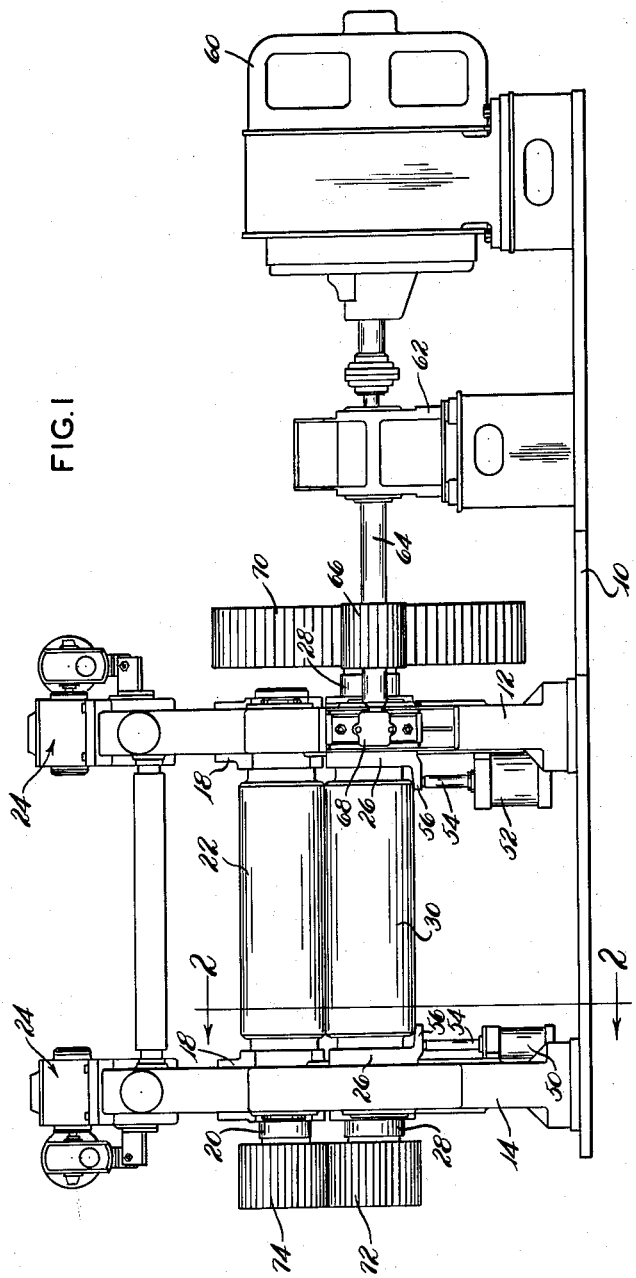

Dec. 31, 1963 R. C. SEANOR 3,115,672
ROLL DROPPING CALENDER
Filed Feb. 20, 1962 2 Sheets-Sheet 1

INVENTOR.
REX C. SEANOR
BY Oldham & Oldham
ATTYS

Dec. 31, 1963  R. C. SEANOR  3,115,672
ROLL DROPPING CALENDER
Filed Feb. 20, 1962  2 Sheets-Sheet 2
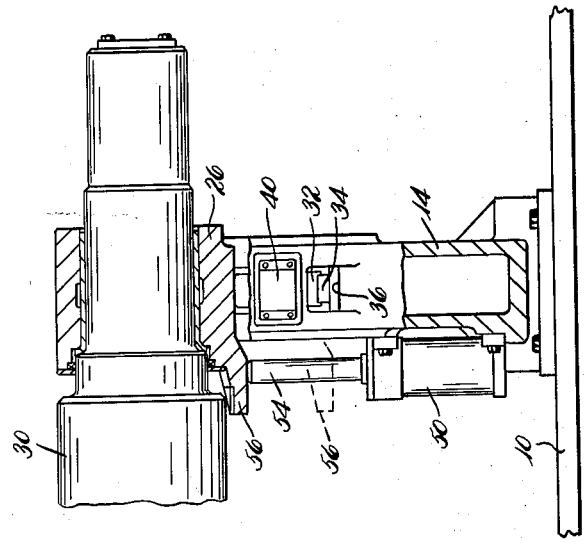
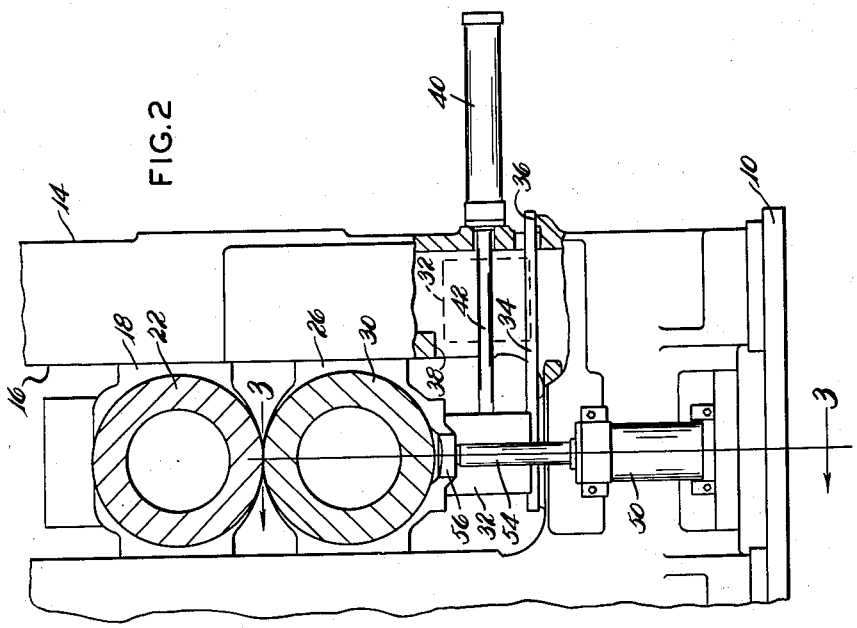
INVENTOR.
REX C. SEANOR
BY
ATTYS

United States Patent Office 3,115,672
Patented Dec. 31, 1963

3,115,672
ROLL DROPPING CALENDER
Rex C. Seanor, Akron, Ohio, assignor to Adamson United Company, Akron, Ohio, a corporation of Ohio
Filed Feb. 20, 1962, Ser. No. 174,542
6 Claims. (Cl. 18—2)

This invention relates to calenders for performing sheeting, shaping, coating and other operations upon rubber and similar plastics, and, more particularly, is concerned with calenders of the indicated type in which the calender rolls can be moved rapidly apart a considerable distance, sometimes called roll dropping, to facilitate cleaning or similar operations upon the calender or upon associated equipment.

It has been standard practice heretofore to provide for adjustment between rolls in a calender by means of adjusting screws which can be rotated to control the clearance between the calender rolls. Because of the necessity to ofttimes adjust this clearance only in thousandths of an inch, such adjusting screws operate relatively slowly, and if these adjusting screws are relied upon to establish a number of inches of clearance between the calender rolls for cleaning and related purposes, the operation is relatively slow and uneconomical.

It has also been proposed heretofore to provide tapered wedges movable in association with calender roll bearings for controlling the clearance between the calender rolls. However, constructions of this type are not adapted to quickly provide relatively large clearance between calender rolls.

Furthermore, it has been proposed heretofore to employ hydraulic cylinders for controlling the raising or lowering of calender rolls and the clearance therebetween, but the proposed constructions shown for example in U.S. Patent Nos. 1,593,653, 1,818,719, 1,925,949, and 2,051,434 provide relatively complicated systems, fail to provide constructions of adequate strength, do not disclose stop or spacer blocks quickly movable to and from positions beneath the lower roll bearing blocks, or fail in other ways to achieve the positive, quickly operating apparatus combination of the present invention.

It has likewise been proposed heretofore to employ a calender in association with an extruder with the discharge head or die of the extruder being positioned closely adjacent the bight of the calender rolls. In apparatus of this type it has been necessary to mount the extruder and the calender for horizontal movement in relation to each other, and to move the calender rolls apart a considerable distance, as for example eight inches, in order to clean the apparatus, to replace the extruder die, and the like. In known equipment the movement of the calender rolls apart has been very cumbersome and slow, and with the resulting clearances such that the calender and the extruder must normally be moved apart horizontally as well.

It is the general object of the present invention to avoid and overcome the foregoing and other difficulties of prior art practices by the provision of a relatively simple, inexpensive, rapidly operating mechanism for facilitating the movement of calender rolls apart a very considerable distance, the combination of the invention being characterized by high strength and durability in operating position, and wherein fine adjustments between the rolls are still achieved by conventional screw means.

Another object of the invention is to provide a roll dropping calender in which the rolls can be very quickly separated to a considerable distance facilitating cleaning of the rolls and associated apparatus and even the replacement of dies in an associated extruder without the necessity for movement apart of the calender and the extruder a considerable horizontal distance.

Another object of the invention is the provision of a roll dropping calender in which the upper roll is moved towards the lower roll by conventional adjusting screws and the bearing blocks of the lower roll are carried upon spacer blocks which can be rapidly moved to and from support position, the movement of the spacer blocks to and from position being achieved by fluid pressure motors operated in conjunction with other fluid pressure cylinders operable to lift, lower, and return the lower roll bearing blocks to and from operative position and a dropped or spaced position.

The foregoing objects of the invention, and other objects which will become apparent as the description proceeds, are achieved by the provision of the combination in a calender of a pair of end frames having opposed vertically extending windows therein, a pair of horizontally directed rolls extending between the frames and positioned one above the other, the rolls having reduced diameter necks extending into the windows of the frames, a roll neck journal block surrounding each roll neck and slidably mounted in the respective windows to position the rolls as aforesaid, means carried by the upper portions of the frame for adjustably positioning the journal blocks of the upper roll to control its clearance with the lower roll, a spacer block positioned between the lower edge of each window and the lower journal block in each window, fluid pressure motor means carried by each end frame and engageable to raise the lower journal block at the lower roll ends away from the spacer blocks and to thereafter lower the lower journal blocks the distance of the spacer blocks and for returning the lower journal blocks to their original position, and fluid pressure motor means for laterally moving the spacer blocks to and from a position in the windows or out of the windows and into the frames.

For a better understanding of the invention reference should be had to the drawings wherein FIG. 1 is a front elevation of a calender incorporating the invention;

FIG. 2 is an enlarged fragmentary vertical cross-sectional view taken substantially on line 2—2 of FIG. 1; and FIG. 3 is a vertical cross-sectional view taken substantially on line 3—3 of FIG. 2, but showing the piston structures in elevation.

In the drawings, the numeral 10 indicates generally a bed plate upon which are mounted a pair of frames 12 and 14 positioned in vertically extending spaced relation, and each having a window 16 therein, as best seen in FIG. 2. The opposed windows 16 slidably support an upper pair of bearing blocks 18 rotatably receiving the reduced diameter roll necks 20 of an upper calender roll 22. The bearing blocks 18 are connected to screw type adjusting means indicated as a whole by the numerals 24 of conventional character and adapted to raise and lower the upper roll 22 to provide fine clearance and pressure adjustments upon the upper roll.

Likewise slidably received in opposed windows 16 are a pair of lower roll bearing blocks 26 which rotatably receive the reduced diameter necks 28 of a lower calender roll 30. The lower bearing blocks 26 are supported upon spacer blocks 32 (see FIG. 2) which are positioned between the bottom of the bearing blocks and the lower side of each window 16. Actually the bearing blocks 32 are each slidably supported upon a plate 34 extending along the lower edge of the window opening 16 and running out to be supported at its other end at 36 on the calender frame. The calender frame is usually made hollow in the manner illustrated to provide a hollow beam construction, and part of the hollow frame is cut away to provide an opening 38 at the lower side of the window 16 through which the spacer block can be moved. The spacer block is adapted to be moved from its supporting full line position shown in FIG. 2 to an out-of-the-way dotted line position in this same figure by means of a fluid pressure motor 40 mounted on the frame and extending horizontally therefrom. The piston rod 42 of the fluid pressure motor is connected to the spacer block 32 to effect lateral movement of the spacer block from the full line to the dotted line position and vice versa, upon the operation of the fluid pressure motor 40. The fluid pressure motor 40 is preferably of the air type so that very rapid movement of the spacer block to and from support position can be effected.

In order to release the weight of the lower calender roll 30 and its bearing blocks 26 from the spacer blocks 32 during the time that the spacer blocks are moved from or to support position, fluid pressure motor means 50 and 52 are provided respectively upon the calender frames 14 and 12. Each of these fluid pressure motors is mounted in a vertically extending direction and upon the inside of each of the calender frames. The fluid pressure motor means each has a piston rod 54 which engages with a projection 56 on each of the bearing blocks 26 so that operation of the fluid pressure motor means 50 and 52 will first slightly raise the lower bearing blocks 26 to allow the spacer blocks 32 to be moved laterally away from support position, and with the fluid pressure motor means 50 and 52 then quickly dropping the lower bearing blocks 26 and the lower calender roll 30 downwardly the thickness of the bearing blocks 32 to provide very rapidly a relatively large clearance between the calender rolls, for example, a clearance of eight inches or more. The fluid pressure motor means 50 and 52 are preferably air to provide a relatively rapid operation such as described.

To return the lower calender roll 30 to operative position the pressure to the fluid pressure motors 50 and 52 is reversed to raise the lower calender roll 30 and its bearing blocks 26 back to a position just above its normal operating position, and with sufficient clearance being provided so that the fluid pressure motors 40 can then be operated to return the spacer blocks 32 to the full line position of FIG. 2. Thereupon the fluid pressure motors 50 and 52 are eased off slightly to allow the lower bearing blocks 26 to again rest upon the upper surface of the spacer blocks 32.

Completing the calender assembly and mounted on the bed plate 10 is an electric motor 60 driving through a gear reducer 62 to drive a shaft 64 carrying a pinion gear 66. The outboard end of the shaft 64 is journalled in an outrigger bracket 68 mounted on the calender frame 12.

The pinion gear 66 engages with a bull gear 70 mounted upon an extension of the roll neck 28. It is the weight of this bull gear 70 which necessitates the fluid pressure motor 52 being made of larger diameter than the fluid pressure motor 50 as shown. Also, it has been found advisable to provide a small vertical offset between the axis of the shaft 64 and the axis of the bottom roll 30. Usually the axis of the shaft 64 mounting the pinion 66 is positioned about one inch below the axis of the roll 30 carrying the bull gear 70. It has been found that this arrangement allows the roll 30 together with the bull gear 70 to be dropped to provide the eight inches or more clearance between the calender rolls without resulting in undesirable noise or interference between the pinion 66 and the bull gear 70 as they unmesh and remesh when the roll 30 is dropped and later returned to operative position.

Completing the assembly of the calender are interdriving gears 72 and 74 positioned respectively upon extensions of the reduced diameter roll necks 28 and 20 of the rolls 30 and 32 respectively.

While a certain representative embodiment and details have been shown for the purpose of illustrating the invention, it will be apparent to those skilled in this art that various changes and modifications may be made therein without departing from the spirit or scope of the invention.

What is claimed is:

1. The combination in a calender of a pair of end frames having opposed vertically extending windows therein, a pair of horizontally directed rolls extending between the frames and positioned one above the other, the rolls having reduced diameter necks extending into the windows of the frames, a roll neck journal block surrounding each roll neck and slidably mounted in the respective windows to position the rolls as aforesaid, means carried by the upper portions of the frame for adjustably positioning the journal blocks of the upper roll to control its clearance with the lower roll, a spacer block positioned between the lower edge of each window and the lower journal block in each window, fluid pressure motor means carried by each end frame and engageable to raise the lower journal block at the lower roll ends away from the spacer blocks and to thereafter lower the lower journal blocks the distance of the spacer blocks and for returning the lower journal blocks to their original position, and fluid pressure motor means for laterally moving the spacer blocks to and from a position in the windows or out of the windows and into the frames.

2. A calender including a frame, two pair of roll neck bearings positioned one above the other and slidably mounted for vertical movement in the frame, a pair of rolls positioned one above the other and each having necks mounted in a pair of bearings, screw means for adjusting the upper pair of bearings and the upper roll toward and from the lower roll, spacer blocks positioned under the lower pair of bearings and between the bearings and the frame, fluid pressure means for rapidly moving the spacer blocks out of the way to allow the lower pair of bearings and the lower roll to drop to provide a clearance between the rolls substantially equal to the thickness of the spacer blocks, fluid pressure means for rapidly lifting the lower bearings off of the spacer blocks to allow the free movement of the spacer blocks out of the way and for controllably dropping the lower bearings and lower roll, both of said fluid pressure means operating in reverse direction to raise the lower bearings and roll and to return the spacer blocks to position beneath the lower bearings, guide means for the spacer blocks carried by the frame and extending from the position to support each spacer block beneath a lower bearing to a position in the frame remote from the first position, and means for driving the calender including a drive shaft carrying a pinion, a bull gear carried by an extension of the neck of the lower roll, said bull gear engaging in driving relation with the pinion, and with the axis of the pinion being positioned slightly below the axis of the lower roll with it in operating position.

3. A calender including a frame, two pair of roll neck bearings positioned one above the other and slidably mounted for vertical movement in the frame, a pair of rolls positioned one above the other and each having necks mounted in a pair of bearings, screw means for adjusting the upper pair of bearings and the upper roll toward and from the lower roll, spacer blocks positioned under the lower pair of bearings and between the bearings and the frame, fluid pressure means for rapidly moving the spacer blocks out of the way to allow the lower pair of bearings and the lower roll to drop to provide a clearance between the rolls substantially equal to the thickness of the spacer blocks, fluid pressure means for rapidly lifting the lower bearings off of the spacer blocks to allow the free movement of the spacer blocks out of the way and for controllably dropping the lower bearings and lower roll, both of said fluid pressure means operating in reverse direction to raise the lower bearings and roll and to return the spacer blocks to position beneath the lower bearings, and means for driving the calender including a drive shaft carrying a pinion, a bull gear carried by an extension of the neck of the lower roll, said bull gear engaging in driving relation with the pinion, and with the axis of the pinion being positioned slightly below the axis of the lower roll with it in operating position.

4. A calender including a frame, two pair of roll neck bearings positioned one above the other and slidably mounted for vertical movement in the frame, a pair of rolls positioned one above the other and each having necks mounted in a pair of bearings, screw means for adjusting the upper pair of bearings and the upper roll toward and from the lower roll, spacer blocks positioned under the lower pair of bearings and between the bearings and the frame, fluid pressure means for rapidly moving the spacer blocks out of the way to allow the lower pair of bearings and the lower roll to drop to provide a clearance between the rolls substantially equal to the thickness of the spacer blocks, and fluid pressure means for rapidly lifting the lower bearings off of the spacer blocks to allow the free movement of the spacer blocks out of the way and for controllably dropping the lower bearings and lower roll, both of said fluid pressure means operating in reverse direction to raise the lower bearings and roll and to return the spacer blocks to position beneath the lower bearings.

5. A calender including a frame, two pair of roll neck bearings positioned one above the other and slidably mounted for vertical movement in the frame, a pair of rolls positioned one above the other and each having necks mounted in a pair of bearings, means for adjusting the upper pair of bearings and the upper roll toward and from the lower roll, spacer blocks positioned under the lower pair of bearings and between the bearings and the frame, means for rapidly moving the spacer blocks out of the way to allow the lower pair of bearings and the lower roll to drop to provide a clearance between the rolls substantially equal to the thickness of the spacer blocks, means for rapidly lifting the lower bearings off of the spacer blocks to allow the free movement of the spacer blocks out of the way and for controllably dropping the lower bearings and lower roll.

6. In a calender, a frame, a pair of cooperating rolls, means journalling each pair of rolls in the frame, means operating through the journalling means for adjustably positioning one roll in relation to the other, block means engaging the journalling means of said other roll and the frame for positioning said other roll in the frame, means for moving the block means out of the way, and means for quickly but controllably moving said other roll into widely spaced relation with said one roll.

References Cited in the file of this patent
UNITED STATES PATENTS 1,575,539     Butterworth _____ Mar. 2, 1926